United States Patent Office 3,268,471
Patented August 23, 1966

3,268,471
PROCESS FOR AGGLOMERATING SOLIDS
Herbert Bartl, Cologne, Wulf von Bonin, Leverkusen, and Wilhelm Göbel, Cologne, Germany, assignors to Farbenfabriken Bayer Aktiengesellschaft, Leverkusen, Germany, a German corporation
No Drawing. Filed Jan. 28, 1964, Ser. No. 340,781
Claims priority, application Germany, Feb. 1, 1963, F 38,891
6 Claims. (Cl. 260—29.6)

Various processes have already been proposed for solidifying or agglomerating finely divided solids such as sand, gravel etc. with the aid of high molecular weight polymerization products or condensation products. The known processes, however, have a number of disadvantages. First among them being the fact to produce a commercially useful agglomeration it is usually necessary to use relatively large quantities of synthetic resins; this, in most cases makes the process uneconomical. To render this type of agglomerating process economical, it has already been proposed to use finished or crude synthetic resins in the form of emulsions of the oil-in-water type. This method, however, has the disadvantage that the particles to be agglomerated do not adhere sufficiently firmly together because the polymer particles present or formed are enclosed in an envelope of water.

A process free of the above disadvantages has now been found for agglomerating fine or coarse particles of solids which are practically insoluble in water. This process consists in utilizing emulsions of the water-in-oil type (reverse emulsions) of polymerizable unsaturated organic compounds, which are insoluble or only sparingly soluble in water and which will polymerize when mixed with the solids to be agglomerated, said emulsions, containing activators, are used for agglomerating of solidifying the individual particles of such solids. In particular it has now been found that reverse emulsions of styrene, acrylic acid esters and/or methacrylic acid esters and/or vinyl esters, and if desired, together with other olefinically unsaturated compounds which are insoluble or sparingly soluble in water and are copolymerizable with these monomers are particularly suitable. These reverse emulsions should additionally have a water content of at least 25 percent, and preferably 50 to 85 percent.

The process of the present invention can be used for the agglomeration of fine or coarse particles of solids which are practically insoluble in water, i.e. for adhering such particles together. The term solids is understood to include for example. loose material such as sand, gravel, loose rock, rock splinters, material in the form of shavings, e.g. wood shavings, metal shavings, shavings of synthetic resins, and fibrous materials (fibre shavings) based on many different inorganic or organic fibre substrates. On the other hand, the process may also be used for agglomerating large quantities of material of large volume or surface, e.g. sand dunes, dykes, dumps of loose stone, swamps, masses of warth of all kinds and forms, solidification of land slides, loose rock in tunnel constructions or in excavations.

The present process is not limited to the solidification or agglomeration of the materials mentioned above but may equally well be used for filling up cavities, for example tears and gaps in stonework, brickwork, etc., for reinforcing fibre fleeces based on natural or synthetic fibres, for filling or solidifying porous materials e.g. particles of pumice, particles of foam plastic etc.

Agglomerating the solids of the type mentioned above may suitably be done by steeping or mixing the said materials in suitable mixing apparatus or by allowing the reverse emulsion to seep into these materials or by introducing the emulsions under pressure, if necessary with the use of a sonde. This mixing process is preferably carried out at or slightly below room temperature (temperatures between 5 and 30° C.), as these emulsions can be well distributed at these temperatures. Since these emulsions have viscosities considerably higher than that of water, they adhere very firmly to the particles to be bonded and do not flow from them. The viscosity of the emulsion to be used in each case may easily be adapted to the particular purpose for which it is used, i.e. the nature of the material to be solidified. This provides very favourable conditions for the bonding process which takes place in the subsequent polymerization. Since the monomer forms the continuous phase in the reverse emulsion, the particles to be solidified are directly bonded very firmly to each other by the polymer when polymerization has been effected, in contrast to the effect obtained when the same monomers are used in emulsions of the oil-in-water type in which the polymer particles themselves are only present as finely dispersed particles.

The polymers to be used for the present process may be obtained in known manner by polymerization of styrene or alkyl- or halogen-substituted styrenes, vinyl esters of a 1 to 4 C-atoms containing aliphatic monocarboxylic acid, acrylic or methacrylic esters, said esters being such of lower aliphatic alcohols of from 1 to 8 carbon atoms or copolymers of these monomers with other copolymerizable compounds which are insoluble or sparingly soluble (i.e. substantially insoluble) in water, by first converting these monomers into a reverse emulsion of the water-in-oil-type and then polymerizing them directly in this form.

Copolymerizable compounds which are insoluble or sparingly soluble in water are, for example, acrylic ester, vinylidene chloride, vinyl ester, vinyl chloride, chloroprene, fumaric acid ester or maleic acid ester and others, the proportion of these copolymerizable compounds preferably not exceeding 50 percent of the total quantity of monomers. The aforementioned comonomers of the ester-type represent such of an aliphatic alcohol of from 1 to 8 carbon atoms or of cyclohexanol.

It is also possible to use polymers which are based on the above mentioned monomers and which have been produced with simultaneous copolymerization of monomers which have a cross linking effect, i.e. comonomers with preferably two or three isolated polymerizable double bonds, such as divinyl benzene, trivinylbenzene, glycol dimethacrylate, hexahydro-triacylic-s-triazine, triallylcyanurate and unsaturated polyesters based on $\alpha:\beta$-unsaturated dicarboxylic acids and di- or more hydric alcohols, for example polyesters of maleic acid and ethylene glycol. These cross-linking monomers should at the most constitute 50 percent, preferably 5 to 30 percent of the total mixture of monomers.

All emulsifiers that have already been proposed for reverse emulsions are suitable for converting the monomers into a reverse emulsion of the water-in-oil-type, e.g. slightly hydrophilic fatty acid solvents, i.e. in particular alkaline earth salts of long chain fatty acids, such as magnesium oleate, hexadecylsodium phthalate, and further, fatty acid esters, especially of sugars, e.g. sorbitan monooleate, saccharose mono- or dilaurate or -stearate and certain inorganic silicates which are known to be capable of forming reverse emulsions, e.g. kaolin which has been pre-treated with dehydro-abistyl-amine. Non-ionic emulsifiers or high molecular weight substances which have already been used for producing reverse emulsions are also suitable for the present purpose. Examples are cyclo rubber or polymers which contain hydroxylic or free carboxyl groups, such as described, for example, in German Auslegeschrift No. 1,148,382. Particularly to be mentioned in this connection are homo- and/or copolymers which carry an aliphatic radical having at least 8 carbon atoms. In addition graft polymers of vinyl compounds grafted on to water-soluble or hydrophilic substances, e.g. graft polymers of styrene and similar vinyl monomers on starch, may be used.

Particularly suitable for use as emulsifiers having a reverse emulsifying effect are polymers which can be prepared in known manner by grafting polymerizable vinyl compounds such as styrene, vinyl esters, acrylates or methacrylates on to polyalkylene oxides which may or may not be substituted at the end groups, especially polyethylene oxide. Also very suitable are reaction products of copolymers of fumaric or maleic acid or copolymers of fumaric or maleic acid semi-esters with alkylene oxides; these are also obtainable by known processes.

Emulsifiers of the last-mentioned type are described in French patent specification No. 1,325,554.

The emulsifiers for producing the above mentioned reverse monomer emulsions are dissolved in the monomers to be emulsified and used in quantities of 0.1 to 30 percent by weight, preferably 0.5 to 15 percent by weight, depending on their emulsifying ability, calculated on the total weight of monomers used.

Polymerization may be initiated on the one hand by water-soluble radical-forming agents or on the other hand by radical-forming agents which are soluble in the monomers. The activator or activator systems to be used for the emulsions in the present process should be mixed with the emulsions before these are introduced into the material that is to be solidified or agglomerated. The activator and the quantity of it to be used must, of course, be so chosen that the latent period of the polymerization starting products leaves sufficient time for working depending on the purpose for which it is to be used. As water-soluble radical-forming agents may be mentioned persulphates, and peroxides, which may advantageously be used in the presence of reducing agents. Suitable reducing agents are mainly acids or lower valency sulphur, such as pyrosulphites, bisulphites and their alkali metal salts as well as basic components having a redox action, for example dimethylaniline or triethanolamine. These polymerization initiators are used in the usual quantities, e.g. about 0.1 to 5 percent calculated on the monomers in the case of initiators which are soluble in the monomers or, in the case of water-soluble initiators, calculated on the aqueous phase contained in the reverse emulsion. Particulars of this polymerization process have been fully described in French patent specification No. 1,335,022.

Monomer-soluble polymerization catalysts (free radical-forming agents) which are suitable for the present process are for example acyl peroxides, such as benzoyl peroxide; alkyl peroxides, such as p-methanhydroperoxide; cumene hydroperoxide; tert. butylhydroperoxide; di-tert. butylperoxide and the like.

Reverse emulsions which harden out at room temperature have been found particularly suitable for the agglomeration or solidification of accumulations of solids or large volume or surface. In these cases, polymerization temperatures between 5 and 35° C. may suitably be employed, and the polymerization initiators are preferably water-soluble initiators in the form of redox systems, for example persulphates of alkali metal or ammonium persulphate in combination with reducing agents such as ammonium bisulphite or bisulphites of alkali metals and/or pyrosulphite and/or amines such as alkanolamine or sodium sulphoxylate.

The reverse emulsion of the monomer may be prepared, for example, by dissolving the emulsifier in the monomer and introducing water with stirring. Stirring must not be too slow if the water-content of the reverse emulsion produced is low and it must not be too vigorous if the water content is high, because otherwise the reverse emulsion will not be stable. Depending on the effectiveness of the emulsifier used, the ratio by weight of monomer to water may be between 3:1 and 1:20, but preferably between 1:1 and 1:7. The emulsifying process may be rendered continuous if suitable stirring apparatus are used.

Depending on the purpose for which the process is used, polymerization may be carried out at temperatures between 0° C. and, when working under pressure, 100° C. Temperatures between 10 and 60° C. are preferably employed.

The reverse emulsion to be polymerized should contain between 25 and 95 percent water. Technically of particular interest in this connection are emulsions having a water-content between 50 and 85 percent. Methods of preparing such polymers based on reverse emulsions and preferred emulsifiers are described in detail in German Auslegeschrift No. 1,148,382, French patent specifications Nos. 1,323,469, 1,325,554, 1,335,022 and Belgian patent specification No. 622,655.

The many different monomers that can be used naturally differ in their suitability for the desired solidification effect. Particularly suitable monomers are styrene, halogen cited styrenes, methacrylic and acrylic acid esters and vinyl esters, especially when mixed with minor quantities of cross-linking compounds having several unsaturated bonds, for example maleic acid or fumaric acid polyesters, glycol dimethacrylate, diallyl phthalate or divinylbenzene. Monomers containing carboxyl groups, e.g. maleic acid semi-esters, may also be used as copolymerization components to improve adhesion. A preferred combination of monomers consists of 60 to 95 percent by weight styrene, vinyl ester, acrylic or methacrylic ester and 40 to 5 parts by weight of an unsaturated, straight-chained or branched polyester based on $\alpha:\beta$-unsaturated dicarboxylic acid or mono- or polyhydric alcohols.

The parts given in the following examples are parts by weight unless otherwise indicated.

*Example 1*

A reverse emulsion obtained from the following components, namely: 100 parts of styrene, 7 parts of an emulsifier having a reverse emulsifying effect and based on a graft polymer of styrene on polyethylene oxide (emulsifier A as described hereinafter), 1 part benzoyl peroxide and 500 parts water was introduced into a box mould. The mould was then charged with 3,000 parts of moist gravel (average particle size about 15 mm. in diameter), so that the mould contained a mixture of reverse emulsion and gravel. The mould was closed and heated to 70 to 80° C. A solid block was formed which could easily be removed from the mould.

The above mentioned emulsifier A was obtained by heating 6,000 parts methanol, 6,000 parts styrene, 4,000 parts polyethylene oxide of molecular weight about 1,550, 20 parts benzoyl peroxide and 20 parts dicumyl peroxide for 2 hours at 80° C. and then 10 hours at 120° C. in an autoclave, with stirring. 12,000 parts water are then added, the mixture heated to 180° C., and the contents of the autoclave blown into cold water, the emulsifier A, which has a reverse emulsifying effect, being thereby precipitated as a granular precipitate.

*Example 2*

By the same method as in Example 1, a reverse emulsion of 150 parts methyl methacrylate, 7 parts emulsifier A, 500 parts water and 1.2 parts azodiisobutyric acid dinitrile was introduced into a box mould which was then filled up with 2,500 parts of blast furnace slag. The mixture is solidified at temperatures between 60 and 70° C.

*Example 3*

A reverse emulsion of 80 parts styrene, 1.8 parts azodiisobutyric acid dinitrile, 10 parts glycol dimethacrylate, 50 parts methacrylic acid methyl ester, 10 parts emulsifier A and 600 parts of water was introduced into a mould together with 1,000 parts of moistened pumice stone having an average particle size between 5 and 7 mm. in diameter. A solid block which can be stored without any significant deformation even at 120° C. is obtained after hardening.

Example 4

5,000 parts of coarse gravel are saturated with a reverse emulsion of the composition: 80 parts styrene, 20 parts solution of a polyester of 0.3 mol maleic acid, 0.7 mol phthalic acid and 1.0 mol butanediol-(1:3), dissolved in styrene (75 parts polyester to 25 parts styrene), 6 parts reversing emulsifier A, 600 parts water, 2 parts potassium persulphate, 1 part sodium pyrosulphite, 1 part triethanolamine, introduced into a mould and hardened out at room temperature in the course of 6 to 12 hours.

Example 5

A reverse emulsion of the components 60 parts styrene, 30 parts solution of a polyester of 0.4 mol maleic acid, 0.6 mol phthalic acid and 1.0 mol propanediol-(1:3), dissolved in styrene (75 parts polyester to 25 parts styrene), 5 parts magnesium stearate (obtained by melting 1.5 mols stearic acid with 1 mol magnesium oxide), 500 parts water, 2 parts potassium persulphate, 1 part sodium pyrosulphite, 1 part triethanolamine is hardened out in a mould together with 1,000 parts broken basalt of a particle size 30 to 40 mm. in diameter within 12 hours at 45° C.

Example 6

(a) By a method similar to that in Example 4, instead of the unsaturated polyester resins mentioned there, the same quantity of divinylbenzene was used, the product hardened at 40° C. and 1,000 parts of polystyrene shavings were used as filler.

(b) In a method similar to that in Example 4, instead of styrene mentioned there, a mixture of 30 parts of ethyl acrylate and 70 parts of styrene were used and hardening carried out at 30° C.

(c) In a method similar to that in Example 4, the total of 2 parts of triethanolamine and sodium pyrosulphite was replaced by 1.0 part of formaldehyde sulphoxylate. The mixture hardens in the box mould in 10 to 15 hours at room temperature.

Example 7

By a method similar to that in Example 4, the reverse emulsion mentioned there is sprayed by a spray gun on to a heap of moist sand in such a way that the emulsion penetrates to a depth of about 3 cm. When the material that has penetrated into the sand has hardened, the surface of the sand heap has hardened to such an extent that there is no more change in form, for example, due to wind or water.

Example 8

By a method similar to that in Example 7, a 30 percent solution of commercial sodium silicate in water instead of the water used in that example for producing the reverse emulsion. The effect of this modification is that, if only a small quantity of the reverse emulsion is applied to the sand and absorbed by it, the solidfied surface has a greater hardness than in the case of Example 7. On the other hand, the tendency of the reverse emulsion to penetrate into the sand is reduced, so that the sand can more easily be provided with a covering layer of pure polymer.

Example 9

A reverse emulsion used in Example 4 is sprayed over a stretch of swamp which is inaccessible by foot, to form a covering layer 3 to 7 cm. in thickness. The mass hardens over night at 15° C. and can then be walked over.

Example 10

A reverse emulsion prepared according to Example 4 is pressed into a box mould filled with 80 parts of wood shavings or pieces until all the cavities are filled with reverse emulsion. The contents of the mould solidifies in a few hours to a solid block of low specific gravity.

Example 11

Process as in Example 4, except that 40 parts styrene are replaced by 40 parts of methyl methacrylate.

Example 12

A fiber fleece consisting of (a) cellulose fibers or (b) polyacrylonitrile fibers or (c) mixtures of cellulose and polyacrylonitrile fibers are impregnated with a reversed emulsion consisting of 70 parts of butylacrylate, 30 parts of vinyl acetate, 600 parts of water, 5 parts of styrene-polyethyleneoxide-graft copolymer (emulsifier A as identified above), 1 part of diisopropylperoxydicarbonate. Polymerization was effected by passing the so impregnated fleece through a water bath of 80° C. A nonwoven fabric of good elasticity and strength is obtained.

What we claim is:

1. A process for solidifying and agglomerating particles of substantially insoluble solids, comprising contacting the particles with an active amount of a reverse emulsion essentially consisting of
   (a) a polymerizable monomer selected from the group consisting of styrene, an acrylic acid ester, methacrylic acid ester and a vinyl ester;
   (b) an active amount of a polymerization catalyst;
   (c) about .1–30% by weight of emulsifier capable of forming reversed emulsions and
   (d) at least 25% by weight of water; and polymerizing the resulting mixture.

2. A process of claim 1 wherein the (d) component consists of 50–85% by weight of water based on the total amount of monomers.

3. A process of claim 1 wherein the polymerizing step is effected at a temperature of about 0°–100° C.

4. A process as claimed in claim 1 which comprises applying as polymerization catalyst a redox system in an amount ranging from about 0.1–5 percent by weight calculated on the amount of water contained in the reversed emulsion.

5. A process as claimed in claim 1 which comprises applying in addition to the monomers indicated, an additional monomer having cross-linking properties in an amount from about 5–30 percent by weight of the total amount of monomers to be polymerized.

6. An agglomerated material obtained according to the process of claim 1.

References Cited by the Examiner

UNITED STATES PATENTS

| | | | |
|---|---|---|---|
| 2,655,496 | 10/1953 | Adams | 260—29.6 |
| 2,739,909 | 3/1956 | Rosenthal | 260—29.6 |
| 2,745,813 | 5/1956 | Logemann et al. | 260—29.6 |
| 2,843,556 | 7/1958 | Moorman | 260—29.6 |
| 2,931,749 | 4/1960 | Kine et al. | 264—109 |
| 3,056,704 | 10/1962 | Rothweiler | 264—128 |

FOREIGN PATENTS 928,621  6/1963  Great Britain.

MORRIS LIEBMAN, *Primary Examiner.*

ROBERT F. WHITE, *Examiner.*

F. H. WHISENHUNT, L. T. JACOBS,
*Assistant Examiners.*